United States Patent
Chester et al.

[11] Patent Number: 6,136,291
[45] Date of Patent: Oct. 24, 2000

[54] FAUJASITE ZEOLITIC MATERIALS

[75] Inventors: Arthur W. Chester, Cherry Hill; C. Patricia Clement, Mt. Royal; Scott Han, Lawrenceville, all of N.J.

[73] Assignee: Mobile Oil Corporation, Fairfax, Va.

[21] Appl. No.: 09/168,639

[22] Filed: Oct. 8, 1998

[51] Int. Cl.$^7$ .................................................. C01B 39/20
[52] U.S. Cl. .................. 423/713; 423/DIG. 21; 423/718; 502/79; 502/85; 502/86
[58] Field of Search .................. 423/700, 713, 423/714, 715, 718, DIG. 21; 502/79, 85, 86

[56] References Cited

U.S. PATENT DOCUMENTS

| | | |
|---|---|---|
| 3,097,115 | 7/1963 | Moos . |
| 3,513,108 | 5/1970 | Kerr ........................................ 423/713 |
| 3,595,611 | 7/1971 | McDaniel et al. ............... 423/DIG. 21 |
| 3,939,058 | 2/1976 | Plank et al. . |
| 3,966,882 | 6/1976 | Maher et al. .................... 423/DIG. 21 |
| 4,036,739 | 7/1977 | Ward . |
| 4,060,568 | 11/1977 | Rodewald . |
| 4,141,859 | 2/1979 | Plank et al. . |
| 4,276,438 | 6/1981 | Chu . |
| 4,783,571 | 11/1988 | Chang et al. . |
| 4,879,019 | 11/1989 | Ward .......................................... 502/79 |
| 5,102,839 | 4/1992 | Borghard et al. . |
| 5,139,984 | 8/1992 | Iwamoto et al. ........................... 502/79 |
| 5,143,876 | 9/1992 | Chang ........................................ 502/64 |
| 5,223,240 | 6/1993 | Roland et al. ........................... 423/713 |
| 5,227,352 | 7/1993 | Tsujii et al. ................................ 502/65 |
| 5,369,070 | 11/1994 | Descat et al. .............................. 502/79 |
| 5,601,798 | 2/1997 | Cooper et al. ................... 423/DIG. 21 |
| 5,646,082 | 7/1997 | Tan-No et al. ................... 423/DIG. 21 |
| 5,686,374 | 11/1997 | Nakoaka ................................... 502/79 |

FOREIGN PATENT DOCUMENTS

| | | |
|---|---|---|
| 236548 | 9/1997 | European Pat. Off. . |
| 2085861 | 5/1982 | United Kingdom . |

OTHER PUBLICATIONS

Zeolite Chemistry and Catalysts, ACS Monograph 171, pp. 137 to 143, by Jule A. Rabo, Editor, 1976 (No Month).

*Primary Examiner*—Mark L. Bell
*Assistant Examiner*—David Sample

[57] ABSTRACT

Novel crystalline zeolitic materials of the faujasite structure having an increased ratio of zeolitic surface area to mesoporous surface area and distinctive X-Ray Diffraction peak ratios are produced by calcining zeolite Y of low sodium content at temperatures above 600° C.

11 Claims, 2 Drawing Sheets

HTC Y and USY Preparation Schemes

HTC Y and USY Preparation Schemes

FAUJASITE ZEOLITIC MATERIALS

FIELD OF THE INVENTION

This invention is directed to new zeolitic materials and to a method of making them. The zeolites are prepared by high temperature treatment of a faujasitic zeolite at a temperature of 600° C. or higher.

BACKGROUND OF THE INVENTION

Naturally occurring and synthetic zeolites have been demonstrated to exhibit catalytic properties for various types of hydrocarbon conversions. Zeolites, which are ordered porous crystalline aluminosilicates, have definite crystalline structure as determined by X-ray diffraction studies. Such zeolites have pores of uniform size which are uniquely determined by unit structure of the crystal. The zeolites are referred to as "molecular sieves" because interconnecting channel systems created by pores of uniform pore size comparable to those of many organic molecular cross sections, allow a zeolite to selectively absorb molecules of certain dimensions and shapes. The pores systems in porous zeolites may be categorized as small, medium or large pore size, depending on the number of oxygen atoms in the ring systems which define the apertures to the interior pore structure of the zeolite. See *Shape Selective Catalysis in Industrial Applications*, Chen et al, Marcel Dekker, N.Y. 1989, ISBN 0-8247-7856-1.

The most important groups of zeolites used industrially for catalytic and other applications such as sorption are the medium (intermediate) and large pore size zeolites. Examples of the former include the widely used zeolite ZSM-5 as well as other materials such as ZSM-23 and ZSM-35. These zeolites are widely used in petroleum refining processes (catalytic dewaxing, FCC additive catalyst) as well as in petrochemical processes (ethylbenzene production, xylene isomerization), to name but a few examples. The large pore zeolites which enjoy the greatest commercial use are the faujasite zeolites Y and ultrastable Y (USY); these are widely used in petroleum refining processes such as FCC and hydrocracking.

Compositionally, zeolites are metallosilicates, with the aluminosilicates being the normal natural form for the zeolites which are found in nature, although other metallosilicates such as borosilicates and ferrosilicates have also been described. In addition, the ratio of silicon to metal in a zeolite may vary from relatively low values to very high ones, extending in principle to infinity, so that the ultimate material is a polymorph of silica. See, for example, "When is a Zeolite not a Zeolite", L. V. C. Rees, *Nature*, 296, 491–2, Apr. 8, 1982. For brevity, zeolites will for the most part be described here as aluminosilicates although it should be remembered that other metals besides aluminum may replace all or part of t he aluminum content of a zeolite. In terms of an empirical formula, zeolites m ay be defined by the formula:

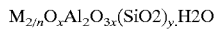

$$M_{2/n}O_xAl_2O_{3x}(SiO_2)_y.H_2O$$

In the empirical formula, x is equal to or greater than 2, since $AlO_4$ tetrahedra are joined only to $SiO_4$ tetrahedra, and n is the valence of the cation designated M. See, for example, D. Breck, *Zeolite Molecular Sieves*, John Wiley & Sons, New York p. 5 (1974). In the empirical formula, the ratio of the total of silicon and aluminum atoms to oxygen atoms is 1:2. M was described a s sodium, potassium, magnesium, calcium, strontium and/ or barium, which complete the electrovalence makeup of the zeolite.

The structural framework of a zeolite is based on an infinitely extending three-dimensional network of $AlO_4$ and $SiO_4$ tetrahedra linked to each other by sharing all of the oxygen atoms so that the ratio of the total aluminum and silicon atoms to oxygen atoms is 1:2. The electrovalence of the tetrahedra containing alumina is balanced by the inclusion in the crystal of the cation, for example an alkali metal, an alkaline earth metal or an organic cation. This can be expressed in the formula above where the ratio of aluminum to the number of various cations, such as Ca/2, Sr/2, Na, K or Li, is equal to unity. One type of cation may be exchanged entirely or partially with another type of cation utilizing ion exchange techniques which have now become conventional. By means of such cation exchange, it is possible to vary the properties of a given aluminosilicate by suitable selection of the cation. In the as-synthesized materials, the cavities and pores are occupied by molecules of water prior to dehydration and/or possibly by organic species from the synthesis mixture.

As previously mentioned, the silica/alumina atomic ratio of a given zeolite is often variable. For example, zeolite X can be synthesized with silica/alumina atomic ratios of from 1.5:1 up to 3:1, while that ratio in zeolite Y is from 3:1 to 6:1. In the synthetic zeolite Ultrastable Y (USY), which is made from zeolite Y by a process of successive ammonium exchange and steaming, the silica:alumina ratio can be made to exceed the value of 6:1 typical for zeolite Y and extend up to high values indeed. In some zeolites, the upper limit of the silica/alumina atomic ratio is unbounded. ZSM-5 is one such example wherein the silica/alumina ratio may extend up to infinity. U.S. Pat. No. 3,941,871 (RE. 29,948), discloses a porous crystalline silicate made from a reaction mixture containing no deliberately added aluminum and ex hi biting the X-ray diffraction pattern characteristic of ZSM-5 zeolites.

The silica/alumina ratio of the "as-synthesized" zeolite can be increased by decreasing the tetrahedral alumina content of the zeolite. Decrease in the tetrahedral alumina may be effected by synthetic methods developed to deplete the tetrahedral alumina of a zeolite. In addition, the silica:alumina ratio of a zeolite may be increased (loss of tetrahedral framework alumina) as a result of process conditions to which the zeolite is subjected during use. Process conditions which will effect depletion of tetrahedral alumina include high temperature calcination and steaming.

Increased silica:alumina ratio in zeolites is associated with increased stability to hydrothermal degradation: zeolites with relatively high silica: alumina ratios are more resistant to the effects of steaming in that they retain crystallinity and catalytic activity buffer than zeolites of lower silica:alumina ratio. It has therefore been considered desirable to use zeolites of higher silica:alumina ratio in many applications where hydrothermal conditions are encountered either during the direct use of the zeolite or when the zeolite catalyst is undergoing regeneration. One application of this type is in the fluid catalytic cracking (FCC) process where the zeolitic catalyst is exposed to high temperatures and copious quantitites of steam during the regeneration step when the coke which accummulates on the catalyst is oxidatively removed prior to recycle of the catalyst to the cracking step. Historically, the FCC process which initially used zeolitic catalysts based on zeolite X (silica:alumina ratio up to 3:1), progressed initially to the use of catalysts based on zeolite Y (ratio of 3:1 to 6:1) and finally to zeolite USY with ratios of 6:1 or higher. The use of zeolite USY has resulted in both process improvement in terms of catalyst stability as well as in a more desirable slate of products and product properties. Zeolite USY is now used in a number of other catalytic applications requiring a large pore size zeolite, for example, hydrocracking.

Various treatments have been proposed for modifying the physical and chemical properties of zeolites. An important method in reducing the activity of zeolite catalysts is by the process of steaming. By controlled steaming, it is possible to produce zeolite catalysts having any desired degree of activity: The degree of steaming of a specified catalyst to achieve a desired activity level is largely dependent upon the nature of the zeolite. Steam treatment, however, often requires long periods of time to treat the catalyst effectively for activity reduction.

U.S. Pat. No. 3,939,058 discloses methods of modifying the catalytic properties of zeolites. One such method is calcination which is defined as heating at high temperatures but below the sintering temperature of the zeolite for varying periods of time. Other methods are also disclosed, including compositing the zeolite in a matrix and steam treatment. The patent further states that the crystallinity retention of catalysts may be improved by precalcination of the crystalline aluminosilicate. For example, the patent states that it has been found possible to preserve the crystallinity of aluminosilicates such as the rare earth exchanged synthetic faujasites, by calcining the zeolite to drive off water, thus forming a more suitable structure and minimizing loss in crystallinity during subsequent rapid drying, as in spray drying, wet processing, steaming and aging. The calcining may be accomplished by heating the crystalline aluminosilicate sieve after ion exchange to a temperature below the sintering temperature of the sieve and generally in the range of 260 to 870° C.

Similarly, U.S. Pat. No. 4,141,859 discloses a method of controlling the relative acid activity of zeolite catalysts, by treating the zeolitic component with air or steam at elevated temperatures, e.g., up to 925° C. in air.

Calcination of the freshly synthesized zeolite to remove adsorbed water and any organic materials that have been used to form the zeolite crystals is necessary to activate the zeolite and accordingly has generally been employed. Also, as stated above, precalcination of the zeolite has been found to stabilize the crystallinity of the zeolite. However, heat treatment may remove hydroxyl groups from the framework of the zeolite. Thus, dehydroxylation of a decationized Y zeolite is discussed in Zeolite Chemistry and Catalysts, ACS Monograph 171, pages 142 and 143, in which dehydroxylation of Y zeolite is stated to result from prolonged calcination at relatively high temperatures, resulting finally in the structural collapse of the zeolite and the formation of an amorphous silica or silica-alumina structure. For these reasons, the use of high temperatures has generally been avoided in zeolite synthesis. When organic materials are to be removed from the freshly synthesized zeolite, temperatures of about 540° C. are typical and generally not exceeded in order to avoid damage to the crystal structure.

Calcination or high temperature treatment has been employed in various catalyst treatments to achieve particular results, for example, to convert impregnated metal or other compounds to different forms as described in U.S. Pat. Nos. 4,276,438 and 4,060,568 or to destroy ion exchange capacity as described in U.S. Pat. No. 3,097,115. However, even in such cases the use of higher temperatures, e.g. above 500° C., has not been preferred because of the undesirable effect on the structure of the zeolite.

Other high temperature treament processes applied to zeolites are described in U.S. Pat. Nos. 5,143,876; 5,102,839; 4,783,571 and 4,141,859. U.S. Pat. No. 5,227,352 describes a method for producing crystalline aluminosilicates by the termal shock treatment of zeolite USY; according to the description of the method it is essential to use USY as the starting material rather than zeolite Y itself.

Besides the specific pore configuration of a zeolite, another indicium of its selectivity is the zeolitic surface area (ZSA) and its relationship to the mesopore area (MSA). Shape selective reactions take place at the active sites in the zeolite created by the presence of the trivalent metal atoms in the zeolite structure; reactions which are not constrained by the pore structure of the zeolite—the non shape selective reactions—may occur at catalytically active sites in the larger pores of the mesopore regions of the zeolite. The acidic catalytic activity of the zeolitic tetrahedral sites is also greater than the activity of similar but non-zeolitic sites. So, if the ZSA is relatively large compared to the MSA, shape selective reactions will be favored as compared to the non-shape selective reactions both by reason of the relatively greater zeolitic surface area available for the shape selective reactions and by the relatively greater catalytic activity of the zeolitic sites. For this reason, a high ratio of ZSA to MSA is preferred. So far, no treatments specifically designed to modify the ZSA and MSA of a zeolite have been described.

SUMMARY OF THE INVENTION

We have now found a method to make novel large pore size crystalline zeolitic materials. These novel crystalline materials are characterized by a high ratio of ZSA to MSA relative to known types of large pore size zeolite catalysts. The new zeolite materials are characterized by an X-Ray Diffraction (XRD) pattern with peaks which are significantly different to those of zeolite USY and which mark it out as a novel composition of matter.

The new zeolitic materials are made by a process of high temperature calcination of zeolite Y. Typically, the calcination is carried out at a temperature of at leat 600° C., normally from 600 to 1000° C., for a period of time sufficient to bring about the desired changes in the zeolite structure (as manifested by the change in XRD). It has been found that a preliminary drying step is required for optimum results from the high temperature calcination, this step normally being carried out at a temperature of 100 to 350° C. to remove physically bound water from the zeolite. By careful drying prior to high temperature calcination, collapse of the zeolite crystal structure can be avoided, particularly at silica:alumina ratios below 5:1 in the starting material. Another requirement is that the Y zeolite starting material should have a sodium content of not more than 5 wt. percent, preferably 0.1 to 4.0 wt. percent prior to drying and calcination.

The thermally treated materials have a high zeolitic surface area (ZSA) relative to the mesoporous surface area (MSA), indicating that catalytically, they will exhibit a high degree of shape selectivity, with less non-selective reactions taking place under selected reaction conditions. Quantitatively, the present high temperature calcined (HTC) materials have a ZSA which is 50 to 150 $m^2g^{-1}$ higher than that of an ultrastable Y zeolite of the corresponding unit cell size (UCS).

The novel zeolite materials may be used as catalytic materials as well as sorption materials. Catalytic applications include reactions such as catalytic cracking, hydrocracking, and other processes requiring catalytic mediation by a large pore size catalytic material. The relatively larger ZSA can be expected to improve shape selective sorption properties and the improved thermal stability will be useful in processes such as catalytic cracking where the catalyst are exposed to hydrothermal dealuminization.

DRAWINGS

DETAILED DESCRIPTION

Starting Materials

Figure 1:
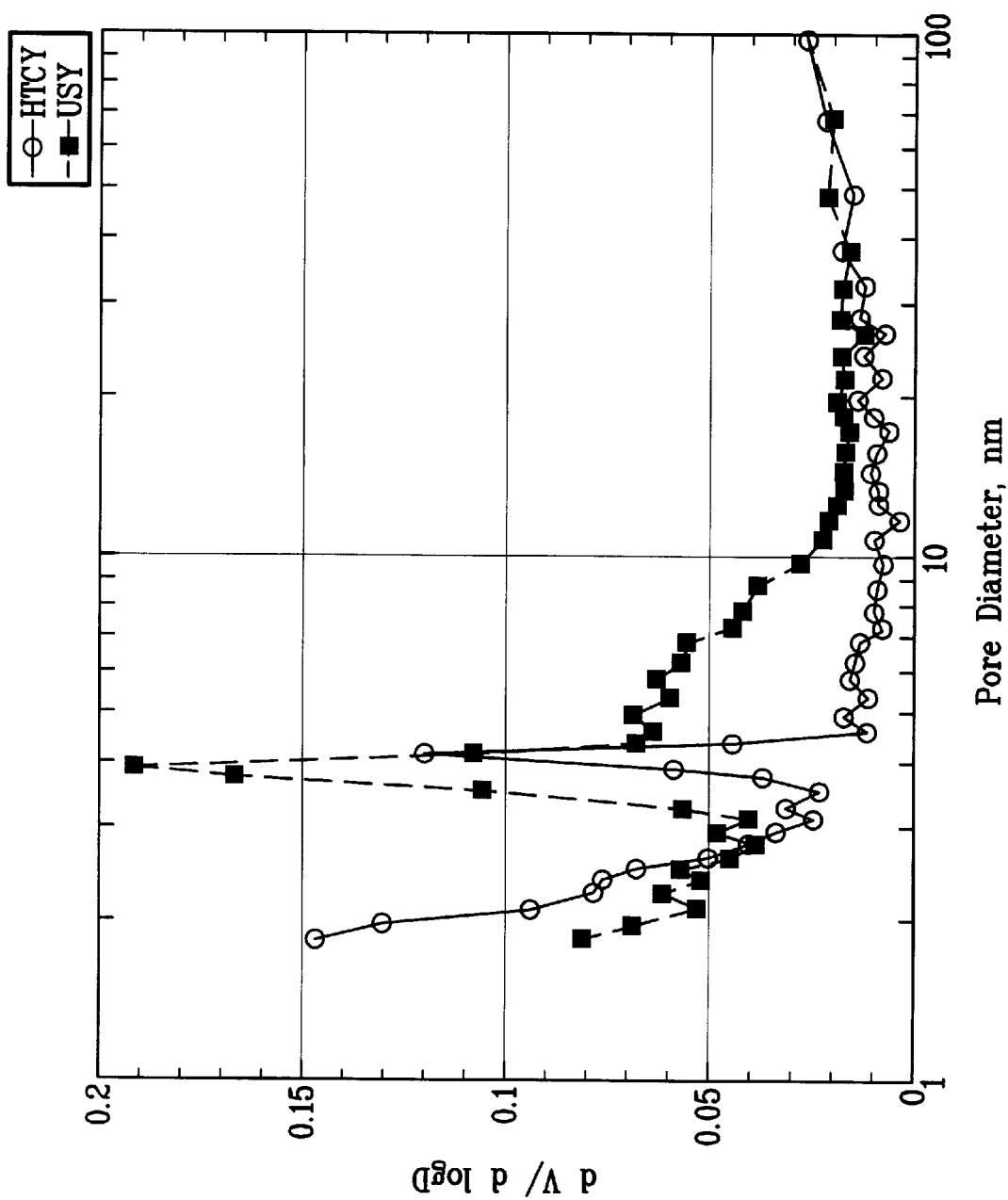
FIG. 1 is a graph showing the nitrogen porosimetric analysis of a typical high temperature calcined zeolite Y compared with that of an ultrastable zeolite Y.

The present preparation uses zeolite Y as a starting material. This zeolite, well established as a commercial product from a number of suppliers, has a silica:alumina ratio in the range of 3:1 to 6:1 measured on the basis of a bulk chemical analysis/ TGA method, prior to the start of the thermal treatment. Zeolite USY which does not undergo the same modification of structure during the high temperature calcination is not used as a starting material.

The unit cell size of the zeolite Y starting material will be in excess of the UCS characteristic of zeolite USY, i.e. at least 2.460 nm and in many cases will be at least 2.470 nm, for example, 2.480 or 2.490 nm. The ZSA will normally be in the range of 850 to 950 $m^2g^{-1}$ and MSA will be in the range of 2 to 10, usually about 6 to 9 $m^2g^{-1}$.

Treatment

The initial treatment step is the reduction of the sodium content to a value below 5 wt. percent and which, for optimum retention of crystal structure in the treated zeolite, should be in the range of 0.1 to 4.0 wt. percent, normally 1 to 2.5 wt. pct. In this step the zeolite Y is converted to the hydrogen or decationized form. The sodium content of the starting zeolite, which may vary according to the source of supply or to the method of synthesis used, and typically is in excess of 5 wt. pct., may be reduced by successive conventional cation exchange steps with solutions of ammonium cations. For example, the zeolite Y may be exchanged with a solution of ammonium nitrate, ammonium sulfate or ammonium chloride, typically at a concentration of 0.1 to 0.5 M. Exchange may be carried out at at ambient temperature or mildly elevated temperature, typically at atmospheric pressure.

We have found that a preliminary drying step is appropriate if the zeolite is to avoid collapse and to retain sufficient crystallinity during the high temperature calcination. This drying step should reduce the moisture level of the zeolite to a value corresponding to removal of the physically bound water from the pore structure of the zeolite. Further drying to remove chemically bound water is not required at this stage with the following high temperature calcination. The drying step becomes more important as the silica:alumina ratio of the starting material decreases from about 6:1 to lower values below about 5:1 since the zeolites with lower silica:alumina ratios are more sensitive to dealumination under hydrothermal conditions, with consequent loss of crystal structure. Drying should be carried out at a temperature of from 100 to 3500° C. for long enough to reduce the total volatile content, most of which is water, to the required level, normally to less than 10 weight percent although lower levels, for example, 5 to 7 weight percent and preferably not more than 5 weight percent, are preferred for better retention of crystalline characteristics and conversion to the desired zeolitic form. Although the ZSA remains substantially above about 800 $m^2g^{-1}$ at moisture levels above 5 weight percent, the MSA increases rapidly above 5 percent water so that this value marks the preferred maximum prior to calcination. The drying step is suitably carried out in a manner which reduces exposure of the zeolite to the steam resulting from the drying. For this reason, drying is preferably carried out using either a thin layer of the zeolite or a technique such as spray drying which minimizes exposure to the moisture. This objective may be served by carrying out the preliminary drying step as a stage in the overall calcination provided that sufficient care is taken to preclude contact of the zeolite with water vapor at excessive temperatures in the early parts of the calcination.

High Temperature Calcination.

The controlled sodium, pre-dried zeolite is subjected to a calcination at a temperature which results in a reduction in the unit cell size of the zeolite, together with changes in the characteristic XRD pattern and changes in the surface areas of the zeolitic and mesoporous surfaces. The zeolitic surface area may increase during the course of the treatment in favorable cases. This calcination is normally best carried out at a temperature of at least 600° C., in order to produce the desired treated product in a reasonable period of time. Normally, the calcination temperature will be in the range of 600 to 1,000° C.; at temperatures above about 1,000° C., dehydroxylation of the zeolite may proceed too fast to be readily controllable resulting in collapse of the crystal structure. The maximum temperature used for the calcination should be selected to be low enough to avoid collapse of the crystal. Generally, the starting materials with higher silica:alumina ratios will withstand the higher calcination temperatures better than the ones with lower silica:alumina ratios, although the technique used for the calcination will also affect the choice of temperature, with methods which minimize the exposure of the crystal to steam permitting relatively higher temperatures. There is an optimum temperature range for calcining each starting material which results in the attainment of the highest ZSA relative to UCS. This temperature, which is usually between about 650 and 800° C., as well as the maximum temperature for any given starting material may be selected by simple empirical determination. Calcination temperatures from 650 to 750° C. will normally give acceptable results with most starting materials.

The calcination is carried out without any intentional addition of water, i.e is carried out "dry", except for the presence of water vapor released by the dehydroxylation of the zeolite during the treatment. Again, the calcination should be carried out in a manner which minimizes the exposure of the zeolite to the released moisture, as for example, by conducting the treatment in a thin layer of the zeolite of using a technique such as a muffle oven which removes the water vapor rapidly from the zeolite. If desired, the calcination may be carried out under an inert (non-reactive) atmosphere such as nitrogen, although this has not been found to be necessary. The calcination is continued until the desired changes in the zeolite crystal structure are achieved, as manifested by the XRD (or other indicia as discussed below) of the novel material.

Zeolite Products

The novel crystalline zeolitic materials are characterized by a number of features which definitely mark them out as being distinguished from existing froms of zeolites. In particular, they are distinct from the zeolite Y starting material in having a lower UCS as well as by a lower proportion of pores in the mesoporous range, taken as the pores with a diameter of 0.4 nm or higher, relative to a similar USY of the same UCS. The UCS may decrease to values as low as 2.440 nm, comparable to those of zeolite USY although the zeolitic material can be readily distinguished from USY by other characterizing properties, as described below. The UCS will normally be in the range of 2.440 to 2.465 nm, preferably 2.450 to 2.454 nm. The UCS may typically decrease up to 0.015 nmas a result of the calcination without structural collapse of the zeolite crystal structure.

The novel materials are readily distinguishable from zeolite USY in having a higher ZSA to MSA ratio for the corresponding UCS and second, a different XRD pattern. The zeolitic surface area of the catalyst may be determined by ASTM D 4365-85 (Standard Test Method for Determining Zeolite Area of a Catalyst). The mesoporous surface area is equated to the matrix area of D 4365-85, that is the difference between the total surface area of the catalyst and the zeolite surface area. The total surface area of the catalyst may be determined by ASTM D 3663.

To take an example of this increased ratio of zeolite surface area relative to the nonzeolitic, mesoporous surface area, a sample of zeolite Y with a silica:alumina ratio of 5.5:1 may be converted to USY zeolite by ammonium exchange followed by steaming at 650 to 750° C. in 100% steam, to give a USY zeolite product with a UCS of 24.52 to 24.54 and a ZSA of 700–750 and a MSA of 40–60. If, however, the same exchanged starting material is dry calcined at 800° C. for 1 hour (no steam added), the final UCS is lower at 24.50 and the ratio of ZSA to MSA is markedly more favorable at ZSA=838, MSA=11. The zeolitic surface area of the calcined product is normally at least 800 $m^2g^{-1}$ and in most cases at least 850 or more, e.g. above 880 $m^2g^{-1}$ to about 900 $m^2g^{-1}$, with the mesoporous surface area usually being not more than 15 $m^2g^{-1}$ and in most cases not more than 10 $m^2g^{-1}$. The ratio of zeolitic surface area to mesoporous surface area in the calcined products is at least 20:1, preferably at least 30:1 and in most cases at least 50:1 or higher; ratios in the range 60:1 to 100:1 are readily achievable.

The concomitant of the increased ratio of zeolitic surface area to mesoporous surface area is a greater mesoporous volume relative to the similar USY zeolite. This is demonstrated by FIG. 1 which is a graph showing the nitrogen porosimetric analysis of a typical high temperature calcined zeolite Y compared with that of an ultrastable zeolite Y of the same unit cell size. The figure demonstrates that the high temperature calcined zeolite (UCS=2.45 nm) possesses a relatively smaller pore volume in the mesoporous size range than the corresponding USY zeolite. In particular, the high temperature calcined zeolite Y has negligible pore volume above 5 nm.

The XRD pattern for the novel materials has a significantly different peak ratio than the USY zeolite with the same UCS. The peak height ratio is calculated by reference to the peak in the XRD pattern which is found at a 2θ value below 10°, usually at 5–6° (2θ) (Peak No. 1). The heights of the peaks which occur at 2θ values above 10° relative to peak below 10° are as follows for the novel zeolitic materials, with given for the peak positions above 10° (expressed as 2θ angle). In the table, as in all reported XRD values in this specification, the XRD values are obtained with Cu K alpha radiation, 0.15406 nm).

| Peak No. | 2θ° | Ratio$_{PH}$ |
|---|---|---|
| 1 | 6.20 ± 0.20 | — |
| 2 | 10.2 ± 0.20 | not more than 0.20 |
| 3 | 12.0 ± 0.30 | not more than 0.15 |
| 4 | 15.7 ± 0.30 | not more than 0.30 |
| 5 | 18.8 ± 0.40 | not more than 0.10 |
| 6 | 20.5 ± 0.40 | not more than 0.15 |
| 7 | 23.8 ± 0.50 | not more than 0.20 |
| 8 | 27.2 ± 0.60 | not more than 0.12 |
| 9 | 31.6 ± 0.70 | not more than 0.10 |

During the treatment, the acidity of the zeolite will decrease as a result of the heat-induced dealumination. The alpha values of the calcined zeolite will normally be in the range of 1 to 10, usually near the lower end of this range, for example, from 2 to 5. The alpha test is a convenient method of measuring the overall acidity, inclusive of both its internal and external acidity, of a solid material such as a molecular sieve. The test is described in U.S. Pat. No. 3,354,078; in the Journal of Catalysis, Vol. 4, p. 527 (1965); Vol. 6, p. 278 (1966); and Vol. 61, p. 395 (1980). Alpha values reported in this specification are measured at a constant temperature of 538° C.

The following Examples are given by way of illustration.

Example 1

Preparation of HTC Y.

Two samples of zeolite Y having $SiO_2/Al_2O_3$ ratios of 3.5 and 5.5 were each prepared in the following manner. The zeolite (100 g) was ammonium exchanged in the conventional manner with ammonium sulfate to a sodium content of 2–3 wt %, as shown in Table 1 below. The drycake was placed in a shallow pan and dried in an oven at 250° C. for 1 hr. The dried zeolite was then transferred immediately to a muffle oven preheated to a temperature in the range of 600–1000° C. for the high temperature calcination. No steam was added to the calcination at any point. The calcination was continued for one hour or until collapse of the zeolite. After calcination was completed, the UCS, ZSA and MSA for the products were measured.

Product Characterization UCS/Surface Area

The data for the product are given in Table 1 below. They show that significant UCS reduction occurred while giving exceptionally high ZSA and low MSA values prior to crystal collapse. The data also show that the starting material with the higher silica:alumina ratio is capable of withstanding higher clacination temperatures without crystal collapse. UCS values are reported in nm and areas in $m^2g^{31\ 1}$.

TABLE 1

High Temperature Calcination of Zeolite Y $NH_4Y\ (SiO_2/Al_2O_3 = 3.5,\ 2.16\%\ Na)$

| | UCS | ZSA | MSA |
|---|---|---|---|
| Starting Parent | 2.498 | 872 | 8 |
| Calcination Temperature, ° C. | | | |
| 600 | 2.491 | 881 | 7 |
| 700 | 2.483 | 897 | 9 |
| 800 | collapse | 3 | 2 |
| 900 | collapse | 0 | 1 |
| 1000 | collapse | 0 | 1 |

TABLE 1-continued

High Temperature Calcination of Zeolite Y

NH$_4$Y (SiO$_2$/Al$_2$O$_3$ = 5.5, 2.45% Na)

|  | UCS | ZSA | MSA | Alpha |
|---|---|---|---|---|
| Starting Parent | 2.469 | 937 | 7 |  |
| Calcination Temperature, ° C. |  |  |  |  |
| 600 | 2.464 | 873 | 7 |  |
| 700 | 2.458 | 891 | 10 | 16 |
| 800 | 2.450 | 838 | 11 | 2 |
| 900 | 2.453 | 852 | 14 | 2 |
| 1000 | collapse | 3 | 1 |  |

Figure 2:
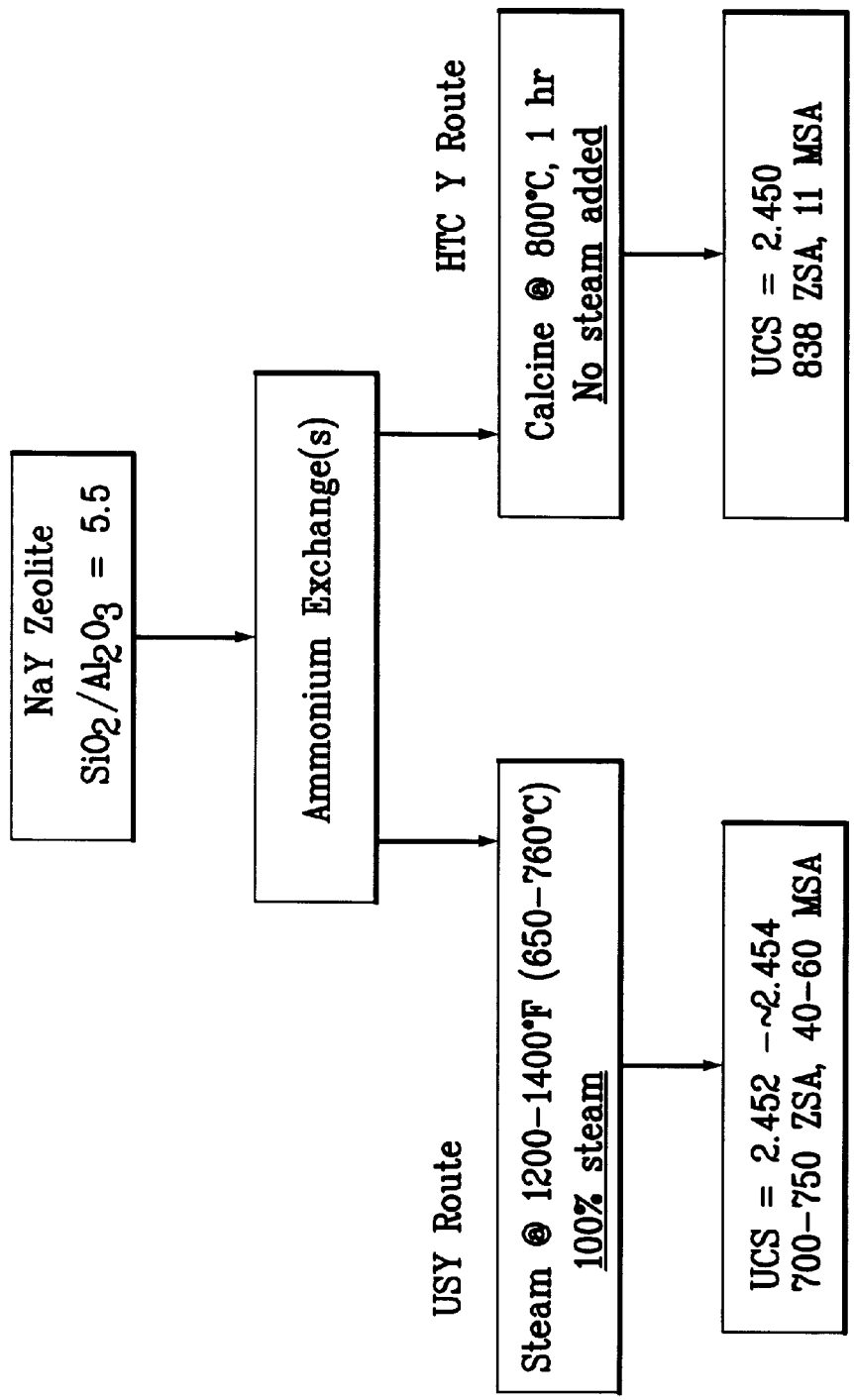
FIG. 2 is a process schematic comparing the method of preparation described below for a typical high temperature calcined zeolite Y with that of zeolite USY, using typical conditions.

FIG. 2 gives the catalyst preparation scheme and compares the surface area and UCS properties of HTC Y with 5.5 SiO$_2$/Al$_2$O$_3$ ratio with that of a conventionally prepared ultrastable Y at the same SiO$_2$/Al$_2$O$_3$. At nearly equivalent UCS ranges, the HTC Y exhibited a 50–150 m$^2$g$^{-1}$ ZSA increase over the USY zeolite.

X-ray Diffraction

The XRD patterns of HTC Y and USY having similar SiO$_2$/Al$_2$O$_3$ ratios are set out in Tables 2 and 3, respectively, using Cu K alpha radiation. The peasks at higher 2θ (>10 2θ) were reduced in peak height relative to the low angle peak (~6° 2θ) for the HTC Y as compared to the USY. Accordingly, the peak height ratios for HTC Y and USY are significantly different, where peak height ratio is defined as:

$$\text{Ratio PH} = \frac{\text{height of XRD peak at } > 10° \ 2\theta}{\text{height of XRD peak at } \sim 6° \ 2\theta}$$

Table 2 below (calculated from the XRD data obtained for the HTC Y and USY) gives the calculated peak height ratios for 8 main peaks between 10–35 2θ. From Table 2, it can be inferred that HTC Y is a significantly different and structurally unique material from USY based on the calculated peak height ratios.

TABLE 2

Calculated XRD Peak Ratios

| Peak no. | 2-Theta angle | Peak Height | Ratio$_{PH}$ |
|---|---|---|---|
| HTC Y | | | |
| 1 | 6.321 | 1377 | |
| 2 | 10.292 | 239 | 0.174 |
| 3 | 12.069 | 154 | 0.112 |
| 4 | 15.865 | 298 | 0.216 |
| 5 | 18.925 | 131 | 0.095 |
| 6 | 20.610 | 156 | 0.113 |
| 7 | 23.922 | 228 | 0.166 |
| 8 | 27.356 | 131 | 0.095 |
| 9 | 31.740 | 93 | 0.068 |
| USY | | | |
| 1 | 6.184 | 1550 | |
| 2 | 10.141 | 420 | 0.271 |
| 3 | 11.905 | 311 | 0.201 |
| 4 | 15.682 | 586 | 0.378 |
| 5 | 18.724 | 261 | 0.168 |
| 6 | 20.409 | 311 | 0.201 |
| 7 | 23.714 | 457 | 0.295 |
| 8 | 27.125 | 262 | 0.169 |
| 9 | 31.502 | 223 | 0.144 |

Example 2

Effect of Preheating.

The same two NH4Y zeolites from Example 1 were calcined at high temperature without first preheating at 250° C. Table 3 gives the data obtained at temperatures from 600–900° C. and comparative data at the same temperature from Example 1. The data indicate the preheating step to be critical in obtaining a crystalline product with reduced UCS. For the 3.5 SiO$_2$/Al$_2$O$_3$ ratio zeolite, crystal collapse was seen at 600–800° C. for HTC Y without preheating and lower stability and lesser UCS reduction was seen for the 5.5 SiO$_2$/Al$_2$ O$_3$ ratio zeolite. These data indicate preheating of the zeolite prior to HTC to be an important step in producing the desired product.

TABLE 3

Effect of Preheating Zeolite

Parent: NH$_4$Y, SiO$_2$/Al$_2$O$_3$ = 3.5, 2.16% Na
2.498 nm UCS, 873 ZSA, 19 MSA

|  | Preheated 600° C. | No Preheat 600° C. |
|---|---|---|
| UCS, nm | 2.491 | collapse |
| ZSA, m$^2$g$^{-1}$ | 881 | 283 |
| MSA m$^2$g$^{-1}$ | 7 | 20 |
|  | 700° C. | 700° C. |
| UCS, nm | 24.83 | collapse |
| ZSA m$^2$g$^{-1}$ | 897 | 237 |
| MSA m$^2$g$^{-1}$ | 9 | 16 |
|  | 800° C. | 800° C. |
| UCS, nm | collapse | collapse |
| ZSA m$^2$g$^{-1}$ | 3 | 256 |
| MSA m$^2$g$^{-1}$ | 2 | 8 |

Parent: NH$_4$Y, SiO$_2$/Al$_2$O$_3$ = 5.5, 2.45% Na
2.468 UCS, 937 ZSA, 7 MSA

|  | Preheated* 700° C. | No Preheat 700° C. |
|---|---|---|
| UCS, nm | 2.458 | 24.62 |
| ZSA m$^2$g$^{-1}$ | 891 | 855 |
| MSA m$^2$g$^{-1}$ | 10 | 9 |
|  | 800° C. | 800° C. |
| UCS, nm | 2.450 | 24.59 |
| ZSA m$^2$g$^{-1}$ | 838 | 860 |
| MSA m$^2$g$^{-1}$ | 11 | 11 |
|  | 900° C. | 900° C. |
| UCS, nm | 2.453 | collapse |
| ZSA m$^2$g$^{-1}$ | 852 | 55 |
| MSA m$^2$g$^{-1}$ | 14 | 8 |

Example 4

Effect of Na Level.

Three NaY zeolites, having SiO$_2$/Al$_2$O$_3$ ratios of 3.5, 4.2, and 5.5, were subjected to high temperature calcination at 700–900° C. In all cases, no steps were taken to reduce zeolite Na levels by ion-exchange; preheating of the zeolites was done at 250° C. for 1 hr prior to HTC. Data are given in Table 4 and show that, in all cases, very little reduction in UCS was observed over the range of HTC temperatures (0.003–0.004 nm reduction). This example shows the significance of zeolite sodium level for producing the desired HTC Y product.

TABLE 4

Effect of Sodium Content

| | | Calcination Temp. | | |
|---|---|---|---|---|
| | Parent | 700° C. | 800° C. | 900° C. |
| NaY, SiO$_2$/Al$_2$O$_3$ = 3.5 | | | | |
| Na, pct. wt % | 10.70 | | | |
| UCS, nm | 2.491 | 2.490 | 2.488 | collapse |
| ZSA m$^2$g$^{-1}$ | 872 | 854 | 814 | 3 |
| MSA m$^2$g$^{-1}$ | 8 | 4 | 8 | 1 |
| NaY, SiO$_2$/Al$_2$O$_3$ = 4.2 | | | | |
| Na, wt % | 10.22 | | | |
| UCS, nm | 2.48 | 2.478 | 2.476 | collapse |
| ZSA m$^2$g$^{-1}$ | 902 | 869 | 858 | 0 |
| MSA m$^2$g$^{-1}$ | 8 | 9 | 8 | 4 |
| NaY, SiO$_2$/Al$_2$O$_3$ | | | | |
| Na, wt % | 6.726 | | | |
| UCS, nm | 2.468 | 2.464 | 2.464 | 2.464 |
| ZSA m$^2$g$^{-1}$ | 904 | 854 | 802 | 152 |
| MSA m$^2$g$^{-1}$ | 3 | 7 | 6 | 1 |

What is claimed is:

1. A large pore size zeolite of the faujasite structure having a unit cell size of from 2.440 to 2.465 nm., a zeolitic surface area of at least 800 m$^2$g$^{-1}$, a mesoporous surface area of not more than 15 m$^2$g$^{-1}$ and a ratio of zeolitic surface area to mesoporous surface area of at least 20:1.

2. A zeolite according to claim 1 which has a peak height ratio (Ratio$_{PH}$) for successive peaks in the X Ray Diffraction (XRD) pattern including a peak below 10° 2θ and peaks above 10° 2θ, as follows, referred to the peak (Peak No. 1) at a 2θ angle below 10°:

| Peak no. | Ratio$_{PH}$ |
|---|---|
| 1 | |
| 2 | not more than 0.20 |
| 3 | not more than 0.15 |
| 4 | not more than 0.30 |
| 5 | not more than 0.10 |
| 6 | not more than 0.15 |
| 7 | not more than 0.20 |
| 8 | not more than 0.12 |
| 9 | not more than 0.10. |

3. A zeolite according to claim 1 which has a unit cell size of from 2.450 to 2.456 nm.

4. A zeolite according to claim 1 which has a ratio of zeolitic surface area to mesoporous surface area of at least 30:1.

5. A zeolite according to claim 1 which has a ratio of zeolitic surface area to mesoporous surface area of at least 60:1.

6. A method of making a large pore zeolite of the faujasite structure, which comprises:

calcining a starting material comprising a faujasite zeolite having a silica:alumina ratio of from 3:1 to 6:1, as determined by bulk chemical analysis, and a sodium content of not more than 4 wt. pct. at a temperature of 600 to 1000° C. for a period of time sufficient to produce a large pore size zeolite of the faujasite structure having a unit cell of from 2.440 to 2.465 nm., a zeolitic surface area of at least 800 m$^2$g$^{-1}$, a mesoporous surface area of not more than 15 m$^2$g$^{-1}$ and a ratio of zeolitic surface area to mesoporous surface area of at least 20:1.

7. A method according to claim 6 in which the sodium content of the faujasite zeolite starting material is from 0.1 to 2.5 wt. pct.

8. A method according to claim 6 in which the silica:alumina ratio of the faujasite zeolite starting material is from 5:1 to 6:1.

9. A method according to claim 6 in which the faujasite zeolite starting material is calcined at a temperature from 600 to 750° C.

10. A method according to claim 6 in which the faujasite zeolite starting material is subjected to a drying treatment before being subjected to the high temperature calcination to remove physically bound water from the zeolite.

11. A method according to claim 10 in which the faujasite zeolite starting material is dried at a temperature from 100 to 350° C. prior to the high temperature calcination.

* * * * *